(12) United States Patent
Gyllenspetz et al.

(10) Patent No.: US 7,458,609 B2
(45) Date of Patent: Dec. 2, 2008

(54) SYSTEM AND METHOD FOR ADJUSTABLY POSITIONING A RESTRAINT SYSTEM IN A MOTOR VEHICLE

(75) Inventors: Per Gyllenspetz, Gothenburg (SE); Bjorn Lundell, Gothenburg (SE)

(73) Assignee: Ford Global Technologies, LLC, Dearborn, MI (US)

( * ) Notice: Subject to any disclaimer, the term of this patent is extended or adjusted under 35 U.S.C. 154(b) by 390 days.

(21) Appl. No.: 11/163,904

(22) Filed: Nov. 3, 2005

(65) Prior Publication Data

US 2007/0096450 A1    May 3, 2007

(51) Int. Cl.
    *B60R 22/00* (2006.01)
(52) U.S. Cl. .................................... 280/801.1; 297/481
(58) Field of Classification Search .............. 280/801.1, 280/801.2, 807, 808; 297/481; *B60R 22/03*
    See application file for complete search history.

(56) References Cited

U.S. PATENT DOCUMENTS

| | | | |
|---|---|---|---|
| 5,236,220 A | | 8/1993 | Mills |
| 5,332,261 A | * | 7/1994 | Siepierski ................ 280/801.1 |
| 6,193,275 B1 | | 2/2001 | Knox |
| 6,255,956 B1 | | 7/2001 | Tingley et al. |
| 6,278,358 B1 | | 8/2001 | Spoto et al. |
| 6,278,377 B1 | | 8/2001 | DeLine et al. |
| 6,308,986 B1 | | 10/2001 | Townsend et al. |
| 6,437,687 B2 | | 8/2002 | Spencer |
| 6,485,058 B1 | | 11/2002 | Kohlndorfer et al. |
| 6,550,805 B1 | | 4/2003 | Gyllenspetz et al. |
| 6,550,867 B2 | | 4/2003 | Rogers, Jr. et al. |
| 6,575,902 B1 | | 6/2003 | Burton |
| 6,655,744 B2 | | 12/2003 | Petri et al. |
| 6,669,234 B2 | | 12/2003 | Kohlndorfer et al. |
| 6,676,162 B2 | | 1/2004 | Gyllenspetz et al. |
| 6,883,834 B2 | | 4/2005 | Grabowski et al. |

(Continued)

FOREIGN PATENT DOCUMENTS

DE      3509984 A1  *  6/1986

(Continued)

OTHER PUBLICATIONS

European Search Report for Application No. 06123091.8-1523, dated Nov. 20, 2007.

*Primary Examiner*—Paul N. Dickson
*Assistant Examiner*—Laura Freedman
(74) *Attorney, Agent, or Firm*—Brooks Kushman P.C.

(57) ABSTRACT

A restraint system for use in a passenger seating area of a motor vehicle includes a seat belt assembly having a webbing extending between a lower anchor and a belt retractor positionable across the body of an occupant. A sensor is coupled with the belt retractor to sense a change in the condition of the seat belt assembly. An inboard anchor disposed opposite the seat belt assembly includes a buckle element adapted to engage and secure a latch element on the webbing. An adjustment mechanism connected to the inboard anchor is configured to move the inboard anchor between a stowed position and at least one deployed position. A controller monitors the sensor to detect change in the condition of the seat belt assembly and instructs the adjustment mechanism to position the inboard anchor between the stowed and at least one deployed positions.

19 Claims, 2 Drawing Sheets

U.S. PATENT DOCUMENTS

| | | |
|---|---|---|
| 2002/0043872 A1 | 4/2002 | Townsend et al. |
| 2004/0044293 A1 | 3/2004 | Burton |
| 2004/0104590 A1 | 6/2004 | Kikuchi et al. |
| 2004/0217583 A1 | 11/2004 | Wang |
| 2005/0012606 A1 | 1/2005 | Lee |
| 2005/0041819 A1 | 2/2005 | Brown |

FOREIGN PATENT DOCUMENTS

| | | | |
|---|---|---|---|
| DE | 3807927 C2 | | 9/1989 |
| GB | 2183560 A1 | | 6/1987 |
| GB | 2356890 A | * | 6/2001 |
| JP | 02114036 A | | 4/1990 |
| WO | 0212031 A1 | | 2/2002 |

* cited by examiner

US 7,458,609 B2

SYSTEM AND METHOD FOR ADJUSTABLY POSITIONING A RESTRAINT SYSTEM IN A MOTOR VEHICLE

BACKGROUND OF THE INVENTION

1. Field of the Invention

The present invention relates generally to occupant restraint systems for use with a passenger seating area in motor vehicles, and more specifically to a restraint system for assisting an occupant in fastening a seat belt while positioned in a vehicle seat.

2. Background Art

Occupant restraint belts (also known as seat belts) are fitted to most types of passenger vehicles in order to protect vehicle occupants from injury during a crash or other abrupt deceleration of the vehicle. One limitation to the effectiveness of modern seat belts is that they require a voluntary and optional act by the occupant to fasten the belt properly around their body. Some persons do not use their vehicle's seat belts because they find it difficult or inconvenient to don the seat belt. This difficulty in donning the belt is sometimes due to the fact that when the buckle is positioned in the unfastened condition, it must assume a stowed position in which it does not obstruct the occupant while entering or exiting the vehicle. This condition is most prevalent in the rear passenger seating area of the vehicle. Consequently, the seat belt is typically configured so that it is pulled to the rear by a retractor mechanism. Further, the buckle, which is adapted to receive a latch or other portion of the belt, may be difficult to see and/or reach when position in the seat bottom.

Systems have been proposed for moving a seat belt, buckle element or latch upward and/or forward to a more easily gripped position after the occupant is seated in the seat. Examples of such systems are disclosed in U.S. Pat. Nos. 6,550,805 and 6,676,162, which are hereby incorporated by reference. It would be advantageous to provide a restraint system for use in a passenger seating area of a vehicle incorporating these features.

SUMMARY OF THE INVENTION

The present invention provides a restraint system for use in a passenger seating area of a motor vehicle includes a seat belt assembly having a webbing extending between a lower anchor and a belt retractor positionable across the body of an occupant. A sensor is coupled with the belt retractor to sense a change in the condition of the seat belt assembly.

An inboard anchor disposed opposite the seat belt assembly includes a buckle element adapted to engage and secure a latch element on the webbing. An adjustment mechanism connected to the inboard anchor is configured to move the anchor between a stowed position and a deployed position. A controller monitors the sensor to detect change in the condition of the seat belt assembly and instructs the adjustment mechanism to position the inboard anchor between the stowed and deployed positions.

A method of moving an inboard anchor of a restraint system associated with a seat of a motor vehicle from a stowed position to a deployed position includes detecting a change in the condition of a belt retractor of a seat belt assembly with a first sensor. The first sensor transmits a signal to a controller indicating a change in the seat belt assembly condition. The controller transmits a signal to an adjustment mechanism connected to the inboard anchor to move the anchor from a first or stowed position to a second or deployed position.

Other features and advantages of the present invention will be readily appreciated and better understood after reading the subsequent description when considered in connection with the accompanying drawings.

DETAILED DESCRIPTION OF THE PREFERRED EMBODIMENT(S)

Figure 1:
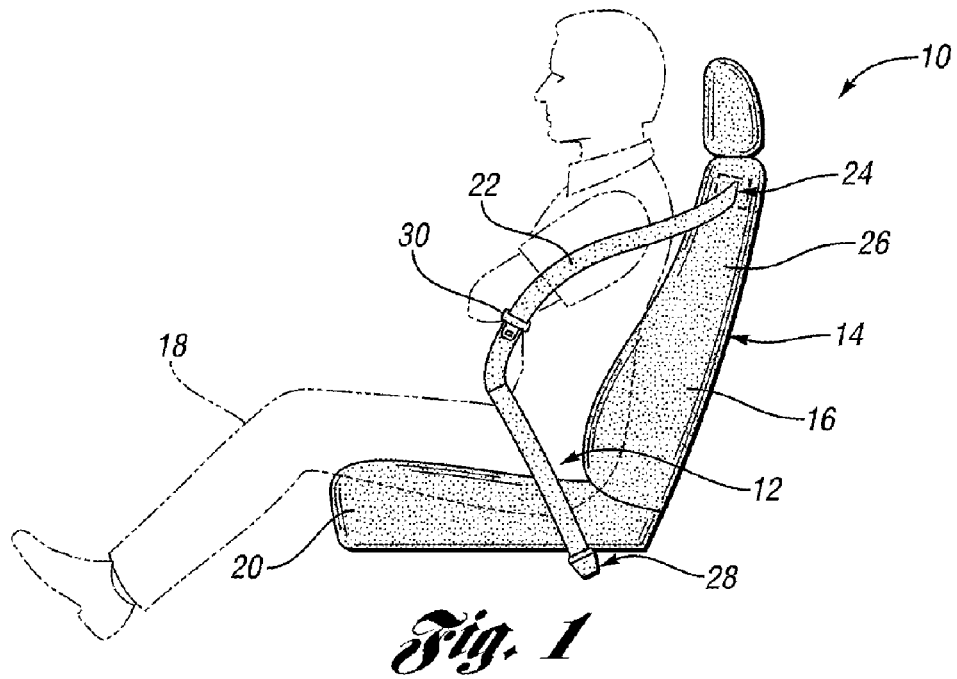
FIG. 1 is a side view of a restraint system for use in a passenger seating area of a motor vehicle in accordance with the present invention.

Now referring to the Figures, a restraint system in accordance with the present invention is shown installed in a vehicle having a passenger seating area. It is understood that the restraint system may be used in either the front or rear passenger seating areas. For purposes of this disclosure, the restraint system will be installed in the rear passenger seating area.

Restraint system 10 includes an associated seat belt assembly 12 incorporated in or disposed adjacent to a vehicle seat 14 or seating area. Vehicle seat 14 is of the type well known in the art. Seat 14 includes a generally upright seat back 16 for supporting the torso of a seated occupant 18 (indicated in phantom lines) and a generally horizontal seat bottom or cushion 20 projecting forward from the bottom portion of the seat back 16 for supporting the pelvis and thighs of the occupant 18.

For purposes of description only, the vehicle seat 14 will be referred to herein as having an inboard side and an outboard side, these terms referring to the sides of the seat adjacent to a center of a vehicle and an exterior side of a vehicle respectively, as is the case if the seat is located on the left side of the vehicle. This disclosure applies equally to a seat located at any position within a vehicle. The belt assembly 12 comprises a length of flexible webbing 22 having an upper end secured to an upper anchor 24 adjacent the upper outboard portion 26 of the seat back 16, and a lower end secured to a lower anchor 28 adjacent the rear portion of the seat bottom 20. A locking or latch element 30, such as a latch plate, slides along the webbing 22 to allow adjustability, and is lockingly engageable with a latch element an inboard anchor (not shown) located adjacent the rear, inboard side of the seat bottom 20.

When latch element 30 is lockingly engaged by the buckle element 34, the webbing 22 defines a lap belt and a shoulder belt in a manner well known in the art to restrain the occupant 18 in the event of a crash or other abrupt deceleration of the vehicle. As an alternative, the lap belt and shoulder belt may be formed as separate lengths of webbing connected by a fitting (not shown) that includes a buckle element engageable with the inboard anchor. It is also contemplated that belt restraint system 10 may be used with a three point, four point or five point belt assembly. The upper anchor 24 preferably comprises a belt retractor 32 that may be housed within seat back 16 (as shown), or mounted to a portion of the vehicle structure such as a roof rail or C-pillar as is well known in the restraints art. The belt retractor 32 is operative to retract the webbing 22 when it is not fastened about the occupant 18, provide for adjustment of the length of the belt for varying-sized seat occupants, and properly position the seat belt restraint system, as is well known in the art. The belt retractor 32 may include load limiter and/or belt pretensioner devices (not shown) of the type well known in the restraints art.

Figure 3:
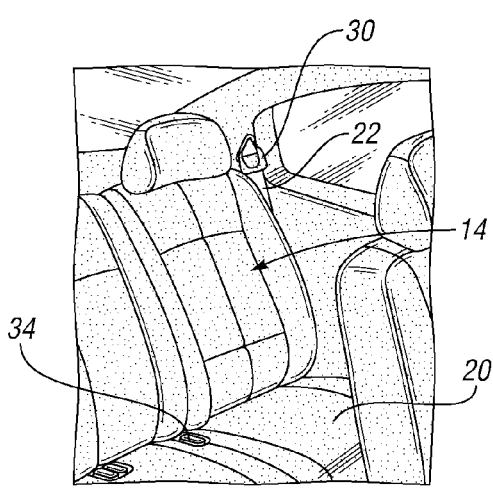
FIG. 3 is a perspective view of the vehicle seating area with the restraint system in a stowed position.

As is illustrated in FIG. 3, prior to an occupant being seated in seat 14, the belt assembly is placed in a stowed position or first position, in which the belt is unfastened and belt retractor (not shown) draws webbing 22 upward so that it extends in a substantially straight line between the upper and lower anchors. In this position, the belt assembly does not interfere with the seat occupant entering or exiting the vehicle. A buckle element 34 connected to an inboard anchor is disposed adjacent the seat bottom 20. Buckle element 34 is configured to receive and secure latch element 30.

Figure 4:
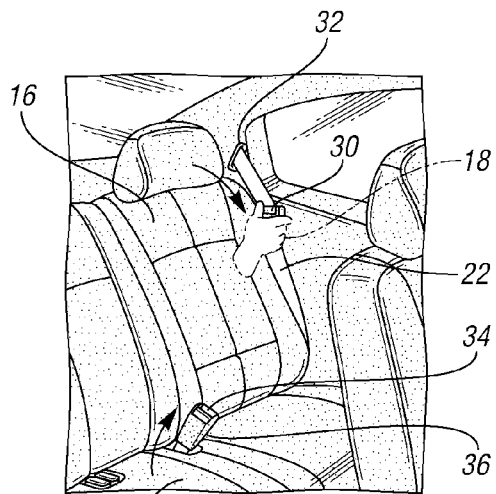
FIG. 4 is a perspective view of the vehicle seating area with the restraint system in an activated or deployed position.

FIGS. 1 and 4 shows restraint system 10 in an activated or deployed position. The occupant 18 grasps the webbing 22 or latch element 30 and pulls it across his/her body to fasten latch element 30 to the buckle element 34 on the inboard anchor 36. Movement of the belt from the stowed position to the second or deployed position requires some amount of the webbing 22 to be drawn out of the belt retractor 32, which requires the occupant to draw the webbing with sufficient force to overcome the winding force of the retractor 32.

Figure 2:
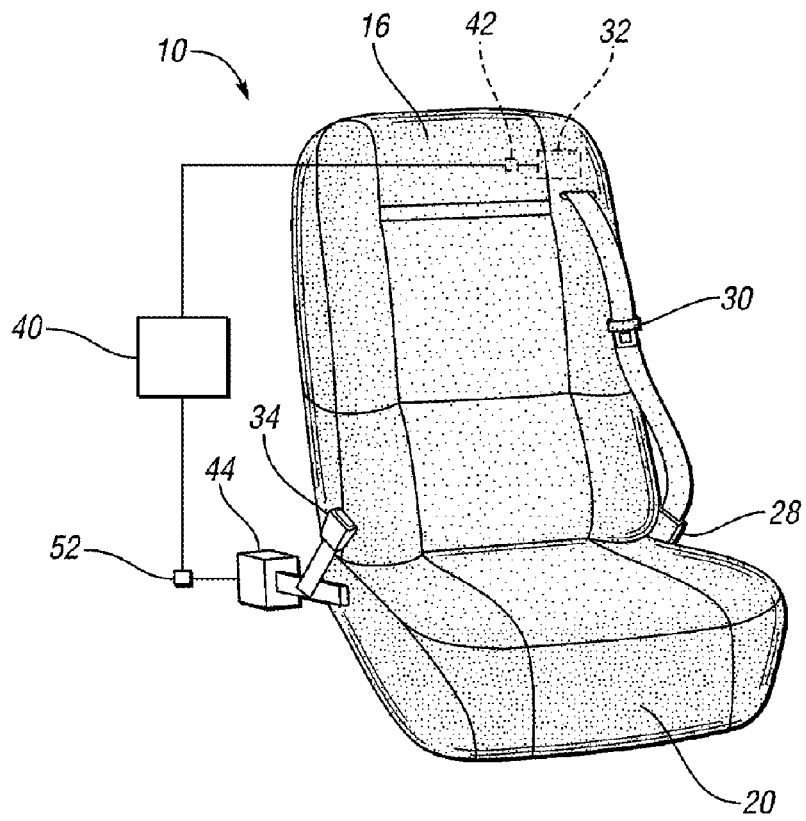
FIG. 2 is a perspective view of the restraint system in combination with a vehicle seat of the present invention.

Referring now to FIG. 2, the restraint system 10 of the present invention is shown with a vehicle seat 14. Restraint system 10 includes a controller 40 that monitors the condition of the seat belt assembly 12 and buckle element 34 of restraint system 10. One or more sensors 42, 52 are disposed adjacent the belt retractor 32 and buckle element 34. Sensors 42, 52 are configured to monitor the condition of the belt assembly 12 and buckle element 34. Sensor 42 monitors the condition of belt retractor 32 to determine whether webbing 22 is drawn from a spooled condition in retractor 32 to a use position.

As is illustrated in FIGS. 2 and 4, when an occupant 18 grasps either the latch element 30 or webbing 22 to pull the webbing 22 away from the seat back 16, also known as the first or stowed position, the sensor 42 transmits a signal to the controller 40 indicating a change in condition in the belt retractor 32. Upon detection of a change in condition of the belt retractor 32, controller 40 instructs an adjustment mechanism 44 operatively connected to the inboard anchor 36 to move the anchor from the first or stowed position to at least a second or deployed position. In the deployed position, the inboard anchor 36 is moved forward relative to the seat back 16 and above the seat bottom 20.

The controller may monitor conditions of the seat and the seat belt assembly through the use of other vehicle systems, such as a seat weight sensor, a door status indicator switch, a buckle status switch, and an ignition switch. For example, the controller may transmit a signal to adjust the position of the inboard anchor in response to a "seat occupied" indication from seat weight sensor, and/or a "door closed" indication from door condition sensor, and/or in response to an "on" indication from ignition key. Sensor 42 may detect the condition of belt retractor using a variety of sensing methods. For example, a sensor may be incorporated into the belt retractor to detect rotational movement of the retractor. Alternatively, a photocell may be disposed adjacent the belt retractor to sense when the webbing is spooled out from the retractor. In another embodiment, a microswitch senses a change in the diameter of the spooled belt, such that a decrease in diameter indicates a change in condition.

Figure 5A:
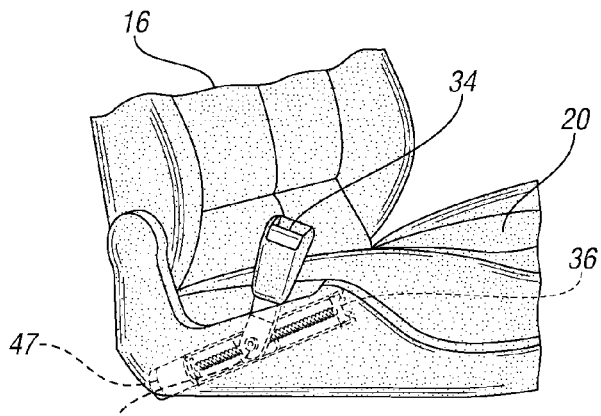
FIG. 5a is a perspective view of an adjustment mechanism in combination with an inboard anchor in accordance with the present invention.
Figure 5B:
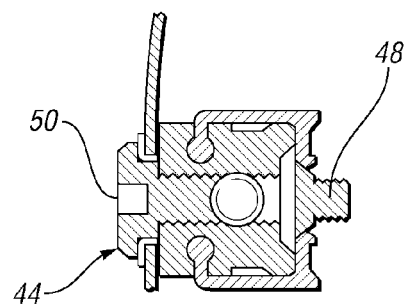
FIG. 5b is a cross-sectional view taken of the adjustment mechanism in accordance with the present invention.

Referring additionally now to FIGS. 5*a* and 5*b*, an adjustment mechanism 44 is coupled to the inboard anchor 36 assists in positioning the anchor 36 between a first or stowed position to at least a second or deployed position. In one aspect of the present invention, adjustment mechanism 44 includes a carrier 46 which receives the inboard anchor 36 and translates between the stowed position and deployed position along a drive screw 48. As best illustrated in FIG. 5*b*, drive screw 48 is rotated by a motor 50. The controller transmits a signal to the motor 50 to move the inboard anchor 36 above a top portion of the seat bottom 20 and forward of the seat bottom 16, presenting the buckle element 34 for convenient securement for the occupant to insert latch element 30.

In another aspect of the present invention illustrated in FIG. 5*a*, the adjustment mechanism comprises a piston adjusted through a cylinder by a gas pressure source, illustrated generally by block identified by numeral 47. In this embodiment, the controller would send a signal to a pressure source to adjust the position of the inboard anchor. A valve controls the flow of pressurized air from the pressure source to the piston traveling in a cylinder, allowing a smooth transition of the buckle element from the stowed position to the deployed position. It is contemplated that a variety of adjustment mechanisms known in the art may also be used to adjust the position of the inboard anchor.

Figure 6:
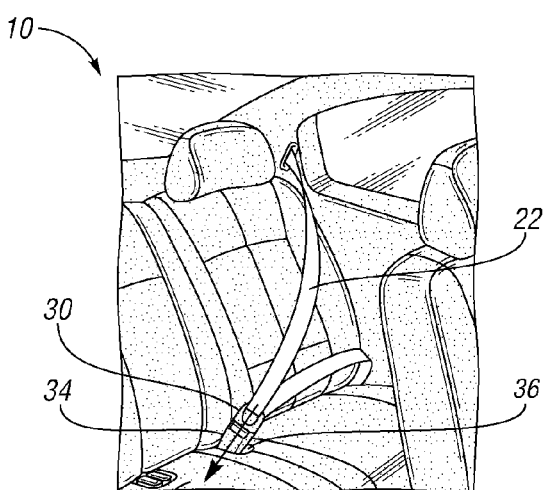
FIG. 6 is a perspective view of the vehicle seating area with the restraint system in a latched position.
Figure 7:
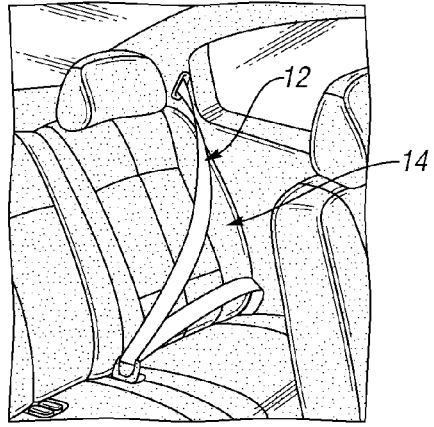
FIG. 7 is a perspective view of the vehicle seating area with the restraint system in a secured position.

Referring now to FIGS. 6 and 7, restraint system 10 is shown in the deployed or activated condition. In the deployed condition, occupant inserts latch element 30 on webbing 22 into buckle element 34 on inboard anchor 36 such that webbing 22 of belt assembly 12 extends adjacent or above the occupant's torso and upper surface of the occupant's thigh. The buckle element 34 is positioned above the seat bottom 20 so that it does not cause any discomfort to occupant if it contacts the occupant's hip or thigh.

In one aspect of the invention, after the occupant has fastened the latch element 34 to buckle element 30, a sensor operatively connected to the buckle element transmits a signal to the controller indicating that the seat belt is properly fastened. The controller then activates adjustment mechanism to move the inboard anchor 36 from the deployed position to the stowed position adjacent to or below the seat bottom 20.

Once returned to the stowed position, shown in FIG. 7, the seat belt assembly 12 will restrain an occupant positioned in the vehicle seat 14. It is contemplated that the user may be able to manually press the latch element and inboard anchor downward into the stowed condition. It is also contemplated that the adjustment mechanism may move the inboard anchor from a deployed position to the stowed position based on the detection of various conditions.

For example, the inboard anchor may return to a stowed position based on the expiration of a set time period. Alternatively, activation of the vehicle ignition circuit, detection of a child seat in the seating area, or other appropriate condition may cause the inboard anchor to return the stowed position. Further, the inboard anchor could be returned to the stowed position based on feedback from another sensor in the vehicle, such as a "door closed" indication from door condition sensor or in response to an "on" indication from ignition key.

It is also contemplated that the adjustment mechanism may move the inboard anchor to at least one deployed position from the stowed position after the buckle element receives the latch element based on detection of a secondary condition by a vehicle system sensor. For example, should a seat occupancy sensor detect the presence of an occupant in the seat, the inboard anchor would be moved from the stowed position to a deployed position when the controller detects feedback from another sensor in the vehicle, such as a "door open" indication from door condition sensor or in response to an "off" indication from ignition key.

A method of moving an inboard anchor of a restraint system associated with a seat of a motor vehicle from a stowed position to a deployed position is described in more detail below. A sensor provided adjacent the belt retractor detects a change in the condition of the retractor based on the movement of the webbing of the seat belt assembly. The sensor transmits a signal to a controller indicating the change in the seat belt assembly condition.

Once the controller receives this signal, the controller transmits a signal to an adjustment mechanism operatively connected to the inboard anchor to move the anchor from a first or stowed position to a second or deployed position. A sensor disposed adjacent a buckle element monitors the condition of the buckle element to detect whether the latch element on the webbing of the belt assembly is secured thereto. When the sensor detects the presence of the latch element in the buckle element, the sensor transmits a signal to the controller. The controller thereby transmits a signal to the adjustment mechanism to move the inboard anchor from the deployed position to the stowed position to secure the occupant positioned in a vehicle seat within the restraint system.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A restraint system for use in a passenger seating area of a motor vehicle, the restraint system comprising:
   a seat belt assembly disposed adjacent the passenger seating area including a webbing extendable between a lower anchor and a belt retractor positionable across the body of an occupant;
   a latch element disposed on the webbing;
   a sensor integrated into the belt retractor for sensing a change in the condition of the seat belt assembly by monitoring the movement of the belt retractor;
   an inboard anchor disposed opposite the seat belt assembly adjacent the seating area having a buckle element adapted to engage and secure the latch element;
   an adjustment mechanism operatively connected to the inboard anchor for moving the anchor between a stowed position and at least one deployed position; and
   a controller configured to monitor the sensor to detect change in the condition of the seat belt assembly,
   wherein the controller instructs the adjustment mechanism to position the inboard anchor between the stowed position and at least one deployed position.

2. The system of claim 1 wherein the webbing of the seat belt assembly extends between the lower anchor mounted adjacent a lower side portion of the seat and an upper anchor including the belt retractor disposed adjacent an upper side portion of the seat.

3. The system of claim 2 wherein the sensor further comprises a photocell disposed adjacent the belt retractor to detect movement of the belt retractor.

4. The system of claim 2 wherein the sensor further comprises a microswitch that senses a change in the diameter of the spooled belt to detect movement.

5. The system of claim 1 wherein the adjustment mechanism further comprises a power source and a carrier configured to engage the inboard anchor to move the anchor between the stowed position and at least one deployed position.

6. The system of claim 5 wherein the adjustment mechanism comprises a motor and a drive screw rotatably driven by the motor which receives the carrier, wherein the carrier travels along the drive screw to move the inboard anchor between the stowed position and at least one deployed position.

7. The system of claim 5 wherein the adjustment mechanism comprises a gas pressure source, a cylinder in communication with the gas pressure source and a piston movable within the cylinder wherein the piston receives the carrier to move the inboard anchor between the stowed position and at least one deployed position.

8. The system of claim 1 further comprising a sensor in communication with the controller for sensing if the buckle element receives the latch element.

9. The system of claim 8 wherein the adjustment mechanism retracts the inboard anchor upon detection of the connection between the buckle element and the latch element.

10. The system of claim 8 wherein the adjustment mechanism moves the inboard anchor from the stowed position to the at least one deployed position upon detection of a change in the condition of a vehicle door by a door condition sensor.

11. A restraint system for use in a passenger seating area of a motor vehicle, the restraint system comprising:
    a seat belt assembly disposed adjacent the passenger seating area including a webbing positionable across the body of an occupant extending between a lower anchor mounted adjacent a lower side portion of the seat and a belt retractor disposed adjacent an upper side portion of the seat;
    a latch element disposed on the webbing;
    a first sensor sensing a change in the condition of the belt retractor;
    an inboard anchor mounted adjacent the passenger seating area opposite the seat belt assembly having a buckle element configured to engage and secure the latch element;
    an adjustment mechanism operatively connected to the inboard anchor having a power source and a carrier for moving the inboard anchor between a stowed position and at least one deployed position;
    a second sensor sensing if the buckle element receives the latch element; and
    a controller configured to monitor the first and second sensors,
    wherein the controller instructs the adjustment mechanism to move the inboard anchor between the stowed position and the at least one deployed position if the first sensor detects movement of the belt retractor and moves the inboard anchor from the at least one deployed position to the stowed position if the buckle element receives the latch element.

12. The system of claim 11 wherein the first sensor is integrated into the belt retractor to monitor the movement of the belt retractor.

13. The system of claim 11 wherein the first sensor further comprises a photocell disposed adjacent the belt retractor to detect movement of the belt retractor.

14. The system of claim 11 wherein the first sensor further comprises a microswitch that senses a change in the diameter of the spooled belt to detect movement.

15. The system of claim 11 wherein the adjustment mechanism moves the inboard anchor from the stowed position to the at least one deployed position upon detection of a change in the condition of a vehicle door by a door condition sensor.

16. A method of moving an inboard anchor of a restraint system associated with a seat of a motor vehicle from a stowed position to a deployed position, the method comprising the steps of:

providing a seat belt assembly disposed adjacent the passenger seating area including a webbing positionable across the body of an occupant, a latch element, a belt retractor disposed adjacent an upper side portion of the seat and a first sensor disposed adjacent the belt retractor;

detecting a change in the condition of the belt retractor with the first sensor;

transmitting a signal from the first sensor to a controller indicating a change in the seat belt assembly condition;

providing an adjustment mechanism having a power source and a carrier configured to move an inboard anchor having a buckle element; and transmitting a signal from the controller to the adjustment mechanism to move the inboard anchor from a first or stowed position to a second or deployed position such that the latch element may be secured to the buckle element.

17. The method of claim 16 further comprising the step of providing a second sensor disposed adjacent the buckle element on the inboard anchor.

18. The method of claim 17 further comprising the step of transmitting a signal from the second sensor to the controller if the second sensor detects that the buckle element receives the latch element.

19. The method of claim 18 further comprising the step of transmitting a signal from the controller to the adjustment mechanism to move the inboard anchor from the deployed position to the stowed position when the second sensor detects that the buckle element receives the latch element.

* * * * *